(12) United States Patent (10) Patent No.: US 8,167,214 B2
Walker (45) Date of Patent: May 1, 2012

(54) METHOD AND DEVICE FOR VISUAL CODE TRANSACTION VERIFICATION

(76) Inventor: Matthew Walker, Brisbane (AU)

( * ) Notice: Subject to any disclaimer, the term of this patent is extended or adjusted under 35 U.S.C. 154(b) by 211 days.

(21) Appl. No.: 12/555,310

(22) Filed: Sep. 8, 2009

(65) Prior Publication Data

US 2010/0228988 A1 Sep. 9, 2010

Related U.S. Application Data

(63) Continuation-in-part of application No. 12/440,500, filed as application No. PCT/AU2006/002013 on Dec. 31, 2006, now Pat. No. 7,997,503.

(30) Foreign Application Priority Data

Sep. 7, 2006 (AU) ................................ 2006904878

(51) Int. Cl.
*G06K 19/06* (2006.01)
(52) U.S. Cl. ......... 235/494; 235/435; 235/457; 235/487
(58) Field of Classification Search .................. 235/435, 235/457, 487, 494
See application file for complete search history.

(56) References Cited

U.S. PATENT DOCUMENTS

| | | | |
|---|---|---|---|
| 4,921,278 A | 5/1990 | Shiang et al. | |
| 4,991,205 A | 2/1991 | Lemelson | |
| 6,249,588 B1 | 6/2001 | Amidror et al. | |
| 7,181,433 B2 | 2/2007 | Yousofi | |
| 2005/0117748 A1* | 6/2005 | Schrijen et al. | ............... 380/200 |
| 2006/0018467 A1 | 1/2006 | Steinmetz | |
| 2006/0020559 A1 | 1/2006 | Steinmetz | |
| 2006/0031174 A1 | 2/2006 | Steinmetz | |

FOREIGN PATENT DOCUMENTS

| | | |
|---|---|---|
| AU | 746473 B2 | 5/2002 |
| DE | 10260124 A1 | 7/2004 |
| GB | 1434907 A | 5/1976 |
| WO | 99/26793 A1 | 6/1999 |
| WO | 01/11591 A1 | 2/2001 |
| WO | 03/060674 A1 | 7/2003 |
| WO | 03/067797 A1 | 8/2003 |

OTHER PUBLICATIONS

International Search Report for PCT/AU2006/002013.

* cited by examiner

*Primary Examiner* — Kristy A Haupt
(74) *Attorney, Agent, or Firm* — Brooks Kushman P.C.

(57) ABSTRACT

A method and device for visual code transaction verification enables more secure electronic transactions. The method includes generating a window having a first pattern of elongated segments. A second pattern of elongated segments is then generated, wherein a dynamic visual code is produced when the window and the first pattern of elongated segments are superimposed with the second pattern of elongated segments. A transaction with a user is then verified by matching the dynamic visual code with a code string entered by the user.

18 Claims, 2 Drawing Sheets

FIG.1
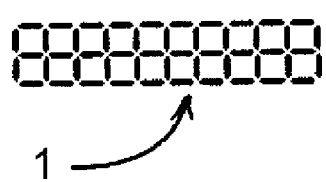
1
FIG.1A
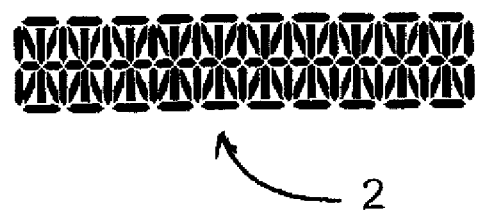
2
FIG.2
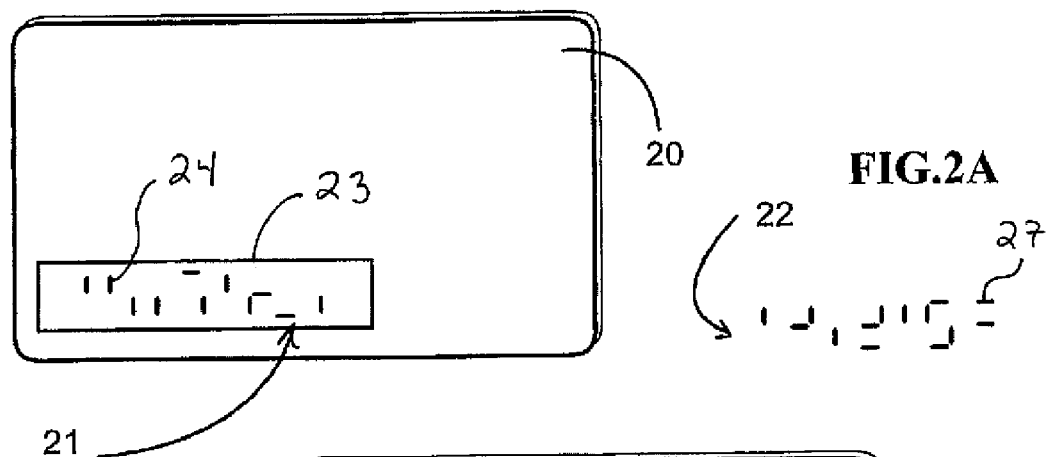
FIG.2A
FIG.2B
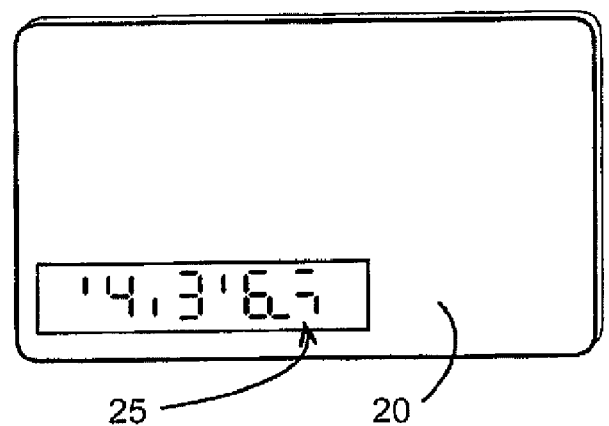

FIG.3
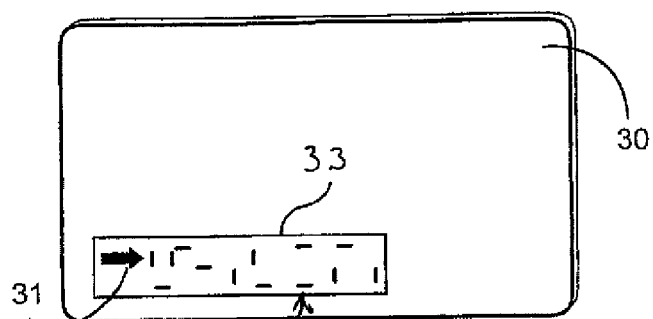
FIG.3A
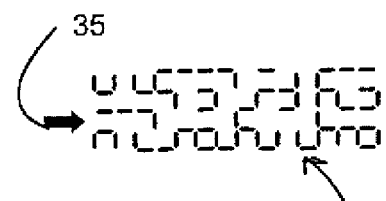
FIG.3B
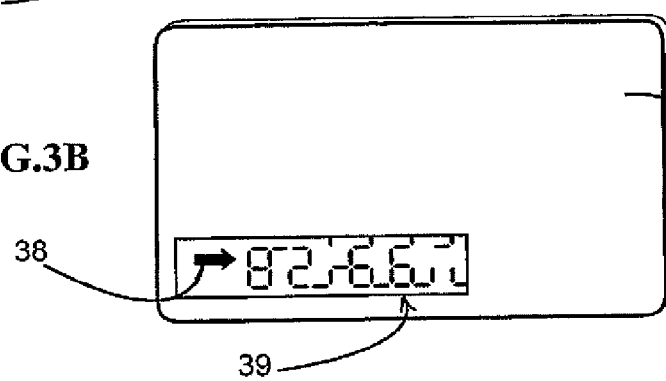
FIG.4
FIG.4A
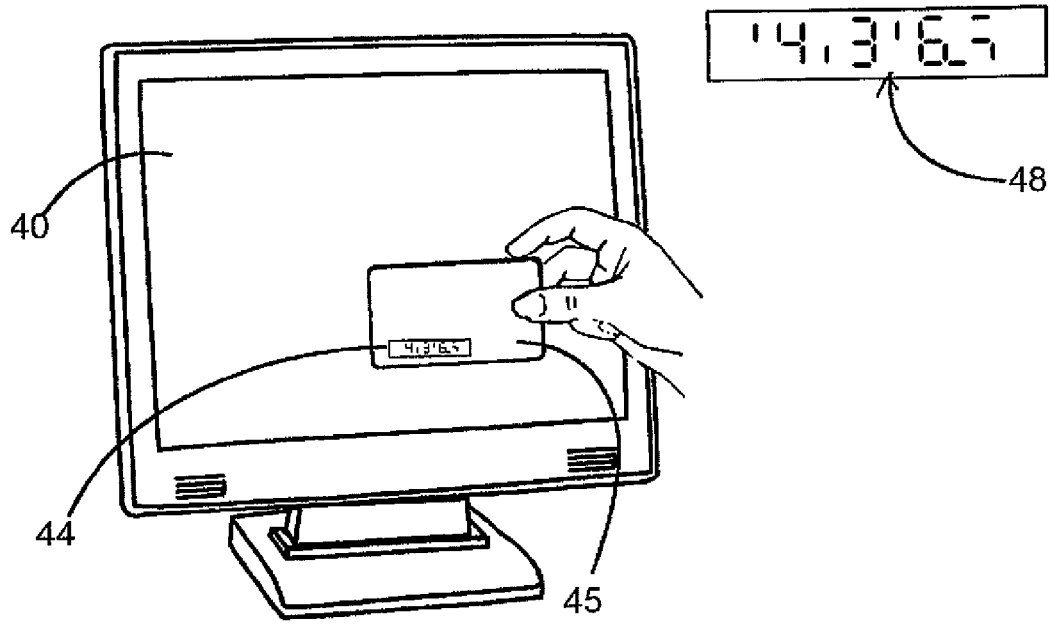

METHOD AND DEVICE FOR VISUAL CODE TRANSACTION VERIFICATION

REFERENCE TO PRIOR APPLICATIONS

This application is a continuation-in-part application of U.S. application Ser. No. 12/440,500, which was the National Stage of International Application No. PCT/AU2006/002013, filed 31 Dec. 2006. The International Publication WO 2008/028215 A1, corresponding to International Application No. PCT/AU2006/002013, is hereby incorporated by reference in its entirety.

FIELD OF THE INVENTION

The present invention relates generally to providing security for electronic transactions against phishing, keylogging, or electronic eavesdropping techniques.

BACKGROUND

The increasing use of transaction verification throughout the world is most visibly exhibited in the credit card or other card payment systems being used commonly in grocery stores, universities and more increasingly, internet websites. A prevalent problem with remote payment card systems has been remote transaction verification. The primary method of transaction verification security involves a user's signature which is often signed onto a sales receipt. Apart from being relatively easy to forge, such a signature system does not adapt itself to modern remote electronic media, such as the internet.

An early verification method involves a basic Luhn algorithm to generate each unique card number in a non sequential manner which is then verified by testing against the algorithm. It is not intended to be cryptographically secure, as it protects against accidental error, not malicious attack. This basic method of verification became increasingly invalid with the advent of the internet, as fraud increased and details of the algorithm became widespread.

Today, half of all credit card fraud is conducted online. In response to this widespread fraud, credit card companies have implemented a static CVV (Card Verification Value) number printed on the back or front of cards at time of issue. The CVV, usually a three or four digit number, is required to be entered at the time of transaction, particularly with online payment. A disadvantage of the CVV number system is that many modern credit card fraud systems use card details including a static CVV number gained from hacking online shopping payment databases, phishing techniques or screen and keylogging programs installed on a victim's computer system. Obviously, a major drawback to the CVV number system is the static nature of the printed numbers, which mean once the card details are compromised the victim can easily be defrauded repeatedly. Furthermore, the simple static nature of the CVV number system method offers little proof that the remote user actually has the physical card in their possession as this simple three or four digit number easily can be shared alongside other card details. In response to this weak security method some banks have begun issuing members with a one-time password generating electronic device or hardware tokens. These devices have a small screen and button which, when pressed, generates a one time dynamically changing password using encrypted secret key programming, changing the password code every minute or so. Disadvantages of this system include the enormous expense of buying and issuing these electronic devices which must be secured from the factory of manufacture, battery maintenance, electronic fragility, inability to carry inside conventional wallets, separation from required membership card, and internal clock synchronization necessary with remote server.

Smart Card technology has also been proposed as a secure verification method. This method has not become widely used, however, due to issues of remote infrastructure cost and availability, electronic cloning, cost of cards with integrated circuits and fragility of those circuits when in day to day use.

Proximity cards used as a payment system in some transportation services have also been proposed. Apart from suffering from the same problems as smart card systems they also have the added security issue of a potential unauthorized third party cloning or charging the card at a distance.

There is therefore a need for a secure, dynamically manipulatable password transaction verification system, but without the associated remote infrastructure costs and electronic security vulnerabilities of the prior art.

BRIEF DESCRIPTION OF THE FIGURES

Although the invention will be described in terms of a specific embodiment as shown in the drawings, it will be readily apparent to those skilled in the art that additional modifications, rearrangements and substitutions can be made without departing from the spirit of the invention. Please note that for the purpose of clear illustration none of the diagram patterns depict semi-transparent shading techniques. Please note that while the number of rows in the depicted patterns should be at least 3 and the number of columns should be at least 2, the possible number of rows and columns is variable according to the number of characters generated and security required.

FIG. 1 is a pictorial view showing a basic elongated segment grid pattern with all possible segments filled, as known according to the prior art.

FIG. 1A is a pictorial view showing a more complex elongated segment grid pattern with diagonal elongated segments capable of depicting segment characters, as known according to the prior art.

FIG. 2 is a pictorial view of an opaque conventional plastic membership card with a transparent window and an example of a possible static elongated segment pattern printed thereon.

FIG. 2A is a pictorial view of a synchronized elongated segment image patter as shown on a typical electronic display.

FIG. 2B is a pictorial view of a conventional plastic membership card with its transparent segment patter superimposed over a synchronized segment pattern revealing a 3 digit segmented visual code.

FIG. 3 is a pictorial view of a conventional plastic membership card with a transparent window and a static elongated segment pattern printed thereon.

FIG. 3A is a pictorial view illustrating a synchronized screen generated image pattern which is larger proportioned than a user's synchronized transparent card pattern so as to induce a larger amount of obfuscation pattern security into the screen generated pattern.

FIG. 3B is a pictorial view of a conventional plastic membership card showing its alignment marker superimposed over a proportionally correct alignment marker image.

FIG. 4 is a pictorial view of a user superimposing a plastic identification card with a transparent segmented pattern over a conventional liquid crystal computer display showing a synchronized segment pattern specifically generated for that user.

FIG. 4A is an enlarged pictorial view of superimposed segment patterns showing a three digit numerical visual code apparent to the user.

DETAILED DESCRIPTION

The present invention relates to a method of generating a humanly readable visual code of characters for use as a one time visual code, comprising a transparent window, with elongated segment pattern thereon, correctly superimposed over a second proportionally similar electronically synchronized elongated segment image pattern. This generated visual code effect is intended for use in electronic transaction verification.

FIG. 1 is a pictorial view showing a basic elongated segment grid pattern 1 with all possible segments filled, as known according to the prior art. FIG. 1A is a pictorial view showing a more complex elongated segment grid pattern 2 with diagonal elongated segments capable of depicting 14 segment characters, as known according to the prior art.

FIG. 2 is a pictorial view of an opaque conventional plastic membership card 20 with a transparent window 23 and an example of a possible static elongated segment pattern 21 printed thereon, according to some embodiments of the present invention. The static elongated segment pattern 21 comprises a plurality of individual elongated segments 24. FIG. 2A is a pictorial view of a synchronized elongated segment image pattern 22 as shown on a typical electronic display, according to some embodiments of the present invention. The synchronized elongated segment image pattern 22 comprises a plurality of individual elongated segments 27. FIG. 2B is a pictorial view of the conventional plastic membership card 20 with its static elongated segment pattern 21 superimposed over the synchronized elongated segment image pattern 22 revealing a three digit segmented dynamic visual code 25.

A method of the present invention is enabled through a variety of different embodiments. One such embodiment being the conventional plastic identification card 20 with pre-recorded elongated segments 24. In a preferred embodiment the elongated segments 24 are straight, and some of the elongated segments 24 are parallel to each other and some of the elongated segments 24 are perpendicular to each other. The elongated segments 24 are printed on a transparent section of the card 20 in the form of the transparent window 23 in a uniformly random grid pattern such as the static elongated segment pattern 21. The transparent window 23 can be placed in any location on the card 20 and be of variable size to suit the dimensions of the pattern used.

In use, a user identifies himself to a server application which locates that user's pre-recorded static elongated segment pattern 21 and is then able to generate the synchronized elongated segment image pattern 22 using that information. When the user's static elongated segment pattern 21 is correctly superimposed over the synchronized elongated segment image pattern 22 the specific humanly readable dynamic visual code 25 (e.g., as shown the digits "4 3 6") becomes apparent to the user. The dynamic visual code 25 then can be used as a one time password for secure transaction verification.

In order to accomplish the generation of the synchronized elongated segment image pattern 22, a unique algorithm may be employed on the server side of a client/server transaction verification process. In summary, a digital representation of the static elongated segment pattern 21 is assigned a user and stored in a server database. When a user requires authentication, the server retrieves the user's digital representation of the static elongated segment pattern 21 from the database and applies the following algorithm:

1. Select a random code of characters to be generated.
2. Add the random code of characters to a temporary storage.
3. Assign each character in the random code of characters a location within the elongated segment grid pattern 1 as shown in FIG. 1, and applying the constraints that each character should have a spacer location between it and the other characters in the random code.
4. Scan each character of the random code of characters in a loop subroutine and, for every assigned random location, confirm the character can be created within the constraints of a synchronized location of the user's static elongated segment pattern 21.
5. If the character can be created within that assigned random location, add to a completed portion of the synchronized elongated segment image pattern 22 only the necessary individual elongated segments 27 to create the character upon superimposition with the user's pre-recorded static elongated segment pattern 21; otherwise, assign this particular character a new available random character location within the elongated segment grid pattern 1 and confirm the character can be created within the constraints of a synchronized location of the user's static elongated segment pattern 21.
6. If the character is unable to be created within any of the available locations of the elongated segment grid pattern 1, return to step 1 and select a new random code of characters to be generated.
7. If each character in the random code of characters has been scanned and successfully assigned a location within the elongated segment grid pattern 1, go to the next step; otherwise, repeat the loop subroutine from step 4 for the next character in the code.
8. Present the synchronized elongated segment image pattern 22 to the user as a challenge for superimposition.
9. Receive a user's response to the presented synchronized elongated segment image pattern 22.
10. Compare the received user's response to the presented synchronized elongated segment image pattern 22 with the random code of characters held in temporary storage from step 2.

A further optional step can be taken after step 7, including adding obfuscation segments (e.g., other elongated segments 27) randomly to the synchronized elongated segment image pattern 22 within the constraints that the obfuscation segments do not create any accidental characters upon superimposition with the user's static elongated segment pattern 21. This strengthens the security of the synchronized elongated segment image pattern 22 against pattern analysis.

The user's static elongated segment pattern 21 is digitally recorded at the time of manufacture of the card 20 and is stored on a secure authenticating server connected to a network. The generation of both the user's static elongated segment pattern 21 and the synchronized elongated segment image pattern 22 is done under certain conditions. The successful comprehension of the dynamic visual code 25 may be based on a uniformly random arrangement of the elongated segments 24 that make up the user's static elongated segment pattern 21. The elongated segments 24 can be displayed in a somewhat evenly distributed fashion for maximum flexibility of possible character generation and to avoid the generation of false characters or obstructing identification of visual characters. The synchronized elongated segment image pattern 22 can be seeded with false segmented patterns designed to make visual analysis of individual patterns more difficult while still displaying the correct dynamic visual code 25 to the user through a combination of electronically displayed individual elongated segments 27 correctly superimposed with the user's static elongated segment pattern 21. A segmented pattern generation application primarily balances user readability and ease of visual alignment with the need for security against visual analysis.

A grid pattern such as the basic elongated segment grid pattern 1 with a variable number of rows and columns made of elongated segments, can be used as a baseline alignment pattern for a visual code effect to be created. While the basic elongated segment grid pattern 1 enables seven segment display characters to be generated anywhere within a seven segment section, by adding alternating elongated diagonal segments between the vertical and horizontal segments, as shown in the complex elongated segment grid pattern 2, more complex fourteen segment display characters can be produced. Individual segments, such as the elongated segments 24, can be either dark, light, transparent, colored or shaded in more complex versions of the same method. Each individual segment can be either darkened or transparent on a user's card or can be dark or light on a synchronized elongated segment image pattern. The size and proportions of a segmented baseline grid can be roughly the same dimensions for both segmented patterns, and the synchronized elongated segment image pattern 22 can be adjusted through simple graphic manipulation. More complex visual patterns can utilize shaded segments which when superimposed with other shaded segments produce stronger visual character segments while providing more pattern noise for added complexity and protection against pattern analysis. A similar property can be utilized with various colored segments and unique color mixing effects.

The individual horizontal and vertical elongated segments 24 can be of varying length, width and height. The dimensions are easily adjustable according to the user's ease of visibility, readability, contrast, background light and ease of physical alignment over various electronic screen resolutions and screen surfaces. Different resolutions of various electronic screens displaying the synchronized elongated segment image pattern 22 provide a challenge with relation to displaying the synchronized elongated segment image pattern 22 with a similar proportional dimension to the user's static elongated segment pattern 21 to facilitate correct superimposed alignment of the elongated segments 24 and the electronically displayed segments 27. However, as know by those having ordinary skill in the art, most online computer screen browsers provide simple detection scripts for screen resolution and easy image dimension adjustment. These dimension settings once detected can be stored for future use by the browser. The simple segmented character style of the visual code combined with the surrounding areas of negative space assist user readability and character comprehension, despite possible slight variation between user and electronic screen pattern dimensions and resolution.

FIG. 3 is a pictorial view of a conventional plastic membership card 30 with a transparent window 33 and a static elongated segment pattern 32 printed thereon. A proportionally adjacent alignment marker 31 is printed to the left of the static elongated segment pattern 32.

FIG. 3A is a pictorial view illustrating a synchronized elongated segment image pattern 36 which is larger proportioned than the user's static elongated segment pattern 32 so as to induce a larger amount of obfuscation pattern security into the synchronized elongated segment image pattern 36. A proportionally correct alignment marker image 35 is generated adjacent the synchronized elongated segment image pattern 36 to conform with a known proportional relationship between the user's alignment marker 31 and the static elongated segment pattern 32.

FIG. 3B is a pictorial view of the conventional plastic membership card 30 showing its alignment marker 31 superimposed over the proportionally correct alignment marker image 35. This correctly aligns the adjacent static elongated segment pattern 32 which is superimposed over the synchronized elongated segment image pattern 36 revealing a four digit segmented dynamic visual code 39 (which as shown reads as "8 2 6 6").

FIG. 4 is a pictorial view of a user superimposing a plastic identification card 45 with transparent segmented pattern over a conventional liquid crystal computer display 40, and showing a synchronized elongated segment image pattern 44 specifically generated for that user.

FIG. 4A is an enlarged pictorial view of the synchronized segment pattern 44 superimposed over a static elongated segment pattern, and showing a three digit numerical visual code 48 (which as shown reads as "4 3 6") apparent to the user.

The number of rows and columns in both a user's static elongated segment pattern and a software generated synchronized elongated segment image pattern can be increased according to the intended number of visual code characters to be visually generated for the user. The number of possible pattern combinations increases with larger numbers of rows and columns allowing greater possible placement options for code characters. The electronically displayed synchronized elongated segment image pattern 36 is able to include more rows and columns than the user's pattern by using the alignment marker 31 superimposed over the proportionally correct alignment marker image 35 to correctly align the user's transparent window 33 over the relevant section of the synchronized elongated segment image pattern 36. The alignment marker 31 and the alignment marker image 35 can comprise any simple shape which is easy to visually align. By including extra rows or columns a synchronized elongated segment image pattern becomes more complex and also increases the difficulty of pattern analysis attacks, without compromising the visual code of characters to be apparent to the user. A proportionally correct alignment marker image 35 is generated adjacent the synchronized elongated segment image pattern 36 to conform with a known proportional relationship between the user's alignment marker 31 and its static elongated segment pattern 32.

An authentication application according to embodiments of the present invention can comprise either software or hardware based electronics and operate on a network between the user's electronic display, an electronic character input device and a secure server storing the electronic representations of the user's static elongated segment pattern 32. As will be understood by those having ordinary skill in the art, the authentication application may be able to generate a string of characters, generate a dynamic visual representation of the generated string of characters in segmented form, generate a random set of elongated segments, electronically combine segmented patterns both stored and generated, and identify visual characters based on an easily visually identifiable set of characters composed of elongated segments, modify generated segmented patterns to conform to identifiable segmented character patterns, and verify or invalidate a transaction based on a user's manually entered code string matching a transaction authentication code.

The synchronized elongated segment image pattern 22, 36 can be generated through a variety of methods. One such simple method is to generate a random pattern of segments, such as a segment 27, in which a uniform density of segments creates a high probability of random characters being created without any predetermination on the part of the application when the user's static elongated segment pattern 21, 32 is superimposed. The software or electronic authentication application can electronically combine both the synchronized elongated segment image pattern and the user's static elongated segment pattern, and identify visual characters within it based on a set of characters, which are easily visually identifiable by people, composed of elongated segments. An electronic display then shows the generated random pattern to the user and the user identified visual characters become the transaction authentication code.

Another method is for the authentication application to generate a string of characters for eventual identification by the user as a verification code. The authentication application then electronically combines the user's static elongated segment pattern with a synchronized elongated segment image pattern and electronically adds segments to the random segment pattern to strategically create the visual segmented representations of the string of characters according to an easily identifiable by people set of characters composed of elongated segments. The modified random segment pattern then has any obstructing segments that may create unintentional visual characters removed and is shown on an electronic display to the user, whereby the visually identifiable segmented string of characters becomes the transaction authentication code.

If a pre-recorded static elongated segment pattern on a user's card is incorrect, superimposing it with a software generated synchronized elongated segment image pattern will present unreadable or incorrect characters and the subsequent user entered character string as a transaction verification code will be incorrect. The transaction verification code as a character string can be entered by the user into an electronic character input device, such as a standard personal computer, which then transmits the code for transaction verification back to the authentication application which initially generated the elongated segment image pattern. This method can be performed on local or internet connected devices such as computers, laptops, personal digital assistants and mobile phones. Transmission of the synchronized elongated segment image pattern and resulting visual code also can be sent by SMS on a mobile phone if a wireless internet connection is not available.

The method also can be used by requesting that a user flip their card 20 horizontally or vertically, or that they rotate their static elongated segment pattern 21 by 90, 180 or 270 degrees, thereby increasing the possible number of segment pattern combinations.

Synchronized elongated segment image patterns also can be depicted as an animated series of patterns which reveal the correct visual code to a user at a specific point in time.

A further variation of the present invention includes a sliding protective panel which covers the user's transparent window 23 when it is not in use to protect against optical recording.

Embodiments of the present invention thus enable remote transaction verification without the need for specialized remote electronic security hardware and infrastructure, while providing security against modern electronic phishing, keylogging or electronic eavesdropping techniques.

According to some embodiments of this invention, transaction verification can be performed by generating a remote dynamic visual code for use as a one time password solution over any network enabled device with a suitable electronic display such as personal computer, laptop, digital assistants, mobile phones without using specialized remote security infrastructure or electronic devices. Security is provided by separating the optical visual code into unidentifiable segmented patterns with the users card segmented pattern not accessible from the network requesting the transaction verification, this defeats most electronic phishing, keylogging or electronic eavesdropping techniques. The dynamic visual code effect is only apparent to the user when both segmented patterns are physically superimposed correctly and can be modified by manipulating the electronically displayed segment pattern. Further, dynamic remote visual codes can be created using a static pattern without the use of specialized remote electronics, infrastructure, tables or any mechanical parts on the cards.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

I claim:

1. A method of verification, the method comprising:
   generating a window having a first pattern of elongated segments;
   generating a second pattern of elongated segments, wherein a dynamic visual code is produced when the window and the first pattern of elongated segments are superimposed with the second pattern of elongated segments; and
   verifying a transaction with a user by matching the dynamic visual code with a code string entered by the user.

2. The method of claim 1, wherein an electronic display shows the second pattern of elongated segments to the user, and the user superimposes on the electronic display the window and the first pattern of elongated segments with the second pattern of elongated segments to reveal the dynamic visual code.

3. The method of claim 2, wherein the electronic display further shows a first visual alignment marker and the window further comprises a second visual alignment marker, whereby the user matches the first visual alignment marker with the second visual alignment marker during superimposition.

4. The method of claim 1, wherein the first pattern of elongated segments is printed on the window.

5. The method of claim 1, wherein the window comprises a transparent section of a plastic identification card.

6. The method of claim 1, wherein the second pattern of elongated segments is generated by an authentication application.

7. The method of claim 1, wherein the second pattern of elongated segments are randomly generated.

8. The method of claim 1, wherein the elongated segments are straight.

9. The method of claim 1, wherein the first pattern of elongated segments is digitally recorded at the time of manufacture and stored on a secure authenticating server connected to a network.

10. The method of claim 1, wherein the elongated segments are depicted with specific shading of individual segments.

11. A method of providing for authorization of a transaction using a card having a recorded segment display pattern printed on a transparent section, the method comprising:
   aligning the recorded segment display pattern across a digital screen, which screen displays a generated pattern image synchronized to correspond to the recorded segment display pattern; and
   manually entering into an electronic apparatus an identifiable series of characters, numbers, shapes or symbols that are presented to a user when the recorded segment display pattern is overlaid with the generated pattern image.

12. The method of claim 11, wherein the generated pattern image is generated based on a secure cryptographic algorithm.

13. The method of claim 11, wherein the card is a plastic identification card.

14. The method of claim 11, wherein the digital screen is an internet connected computer screen.

15. The method of claim 11, wherein the card includes a sliding protective panel which covers the segment display pattern printed on the transparent section when the pattern is not in use.

16. The method of claim 11, wherein the card includes an alignment marker.

17. The method of claim 11, wherein the generated pattern image includes an alignment marker.

18. The method of claim 11, wherein the generated pattern image changes after a predetermined time interval.

* * * * *